(12) United States Patent
Hsu et al.

(10) Patent No.: US 10,408,697 B2
(45) Date of Patent: Sep. 10, 2019

(54) DOWNHOLE TOOLSTRING SPACER PLACEMENT SYSTEMS AND METHODS

(71) Applicant: Schlumberger Technology Corporation, Sugar Land, TX (US)

(72) Inventors: Kai Hsu, Sugar Land, TX (US); Scott C. Cook, Katy, TX (US); Daniel Schulz, Houston, TX (US); Gregory Au, Houston, TX (US); Samuel P. Subbarao, Richmond, TX (US); Abhishek Agarwal, Sugar Land, TX (US); Ashers Partouche, Katy, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 364 days.

(21) Appl. No.: 15/392,615

(22) Filed: Dec. 28, 2016

(65) Prior Publication Data

US 2018/0181700 A1    Jun. 28, 2018

(51) Int. Cl.
*G01L 5/04* (2006.01)
*E21B 17/00* (2006.01)

(52) U.S. Cl.
CPC .............. *G01L 5/04* (2013.01); *E21B 17/00* (2013.01)

(58) Field of Classification Search
CPC ......... E21B 17/028; E21B 4/18; B29C 64/00; B33Y 80/00; Y02P 10/295; G06F 17/50; B22F 3/1055
See application file for complete search history.

(56) References Cited

U.S. PATENT DOCUMENTS

| | | | |
|---|---|---|---|
| 2009/0316528 A1* | 12/2009 | Ramshaw | E21B 44/00 367/83 |
| 2011/0048700 A1* | 3/2011 | van Zuilekom | E21B 49/08 166/250.01 |

(Continued)

OTHER PUBLICATIONS

W. E. Helmick and A. J. Longley, "Pressure-differential Sticking of Drill Pipe and How it can be Avoided or Relieved," presented at the meeting of the pacific coast District in May 1957. pp. 55-61.

(Continued)

*Primary Examiner* — Changhyun Yi
(74) *Attorney, Agent, or Firm* — Eileen Pape

(57) ABSTRACT

Techniques for improving implementation of a downhole tool string to be deployed in a borehole formed in a sub-surface formation. In some embodiments, a design device determines a model that describes expected relationship between properties of the downhole tool string, the borehole, the sub-surface formation, and mud cake expected to be formed in the borehole; determines calibration locations along the borehole based on properties of the borehole; determines candidate spacer configurations based on contact force expected to occur at contact points between the downhole tool string and the mud cake when deployed with each of the candidate spacer configuration via the model; and determines a final spacer configuration to be used to attach one or more spacers along the downhole tool string based on expected head tension to move the downhole tool string when deployed in the borehole with each of the candidate spacer configurations via the model.

20 Claims, 11 Drawing Sheets

(56) References Cited

U.S. PATENT DOCUMENTS

2012/0166157 A1* 6/2012 Whittaker ............... E21B 43/24
              703/2
2014/0343857 A1* 11/2014 Pfutzner ............... G01V 5/101
              702/8
2017/0175490 A1* 6/2017 Hsu ................... E21B 49/00

OTHER PUBLICATIONS

H. D. Outmans, "Mechanics of Differential Pressure Sticking of Drill Collars," AIME Petroleum Transaction, vol. 213, 1958. pp. 265-274.

M. R. Annis, P. H. Monaghan, "Differential Pressure Sticking—Laboratory Studies of Friction between Steel and Mud Filter Cake," SPE 151, Journal of Petroleum Technology, May 1962, pp. 537-543.

J. M. Courteille, C. Zurdo, "A New Approach to Differential Sticking," SPE 14244, presented in 1985 SPE ATCE, Las Vegas, NV.

* cited by examiner

DOWNHOLE TOOLSTRING SPACER PLACEMENT SYSTEMS AND METHODS

BACKGROUND

This disclosure generally relates to downhole tools and, more particularly, to placement of spacers along a downhole tool.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as an admission of any kind.

Generally, a downhole tool may be deployed in a well, for example, to facilitate determining characteristics of a surrounding formation. In some instances, to facilitate determining the characteristics of formation, the downhole tool may be moved within a borehole (e.g., wellbore) formed in the formation. For example, the downhole tool may be lowered into the borehole and/or pulled out of the borehole.

To form the borehole, a drill bit may excavate a portion of the formation. A drilling fluid, commonly referred to as "mud" or "drilling mud," may be pumped into the borehole, for example, to cool and/or lubricate the drill bit. Generally, the drilling mud may include solid particles, such as dirt, suspended in liquid, such as water. When the formation is permeable, the liquid part of the drilling mud may invade the formation leaving the solid component on the borehole wall. Overtime, a layer of the solid particles, commonly referred to as "mud cake," may form on the wall of the borehole.

When in contact with the mud cake, the movement of the downhole tool within the borehole may be impeded. For example, when stationary, the mud cake may harden around the downhole tool, thereby holding the downhole tool in place. Moreover, pressure differential (e.g., difference between mud pressure and formation pressure) may push the downhole tool firmly against the borehole wall. In some cases, to disengage the downhole tool from borehole wall, operations (e.g., fishing) may be performed. However, performing such operations may reduce the productivity time of the downhole tool. Even when in motion, the mud cake may contact the downhole tool, thereby causing friction that resists movement of the downhole tool, which, in some instances, may cause movement of tool to be less predictable.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. Again, the brief summary presented above is intended only to familiarize the reader with certain aspects and contexts of embodiments of the present disclosure without limitation to the claimed subject matter.

One embodiment of the present disclosure describes a manufacturing system used to implement one or more spacers along a downhole tool string to be deployed in a borehole formed in a sub-surface formation. The manufacturing system includes a manufacturing tool that attaches the one or more spacers along the downhole tool string based at least in part on a final spacer configuration. Additionally, the manufacturing system includes a design device that determines a model, which describes an expected relationship between properties of the downhole tool string, properties of the borehole, properties of the sub-surface formation, and properties of mud cake expected to be formed on a surface of the borehole; determines a plurality of calibration locations along the borehole based at least in part on the properties of the borehole; determines a plurality of candidate spacer configurations based at least on contact force expected to occur at contact points between the downhole tool string and the mud cake when the downhole tool string is deployed with each of the plurality of candidate spacer configurations via the model; and determines the final spacer configuration based at least in part on an expected head tension to move the downhole tool string along the borehole when the downhole tool string is deployed with each of the plurality of candidate spacer configurations via the model.

Another embodiment of the present disclosure describes a method for implementing a downhole tool string to be deployed in a borehole formed in a sub-surface formation. The method includes determining, using a design device, a model that describes an expected relationship between properties of the downhole tool string, properties of the borehole, properties of the sub-surface formation, and properties of mud cake expected to be formed on a surface of the borehole; determining, using the design device, a plurality of candidate spacer configurations each corresponding to a different depth in the borehole, in which each of the plurality of candidate spacer configurations is determined based at least in part on a contact force expected to occur at one or more contact points between the downhole tool string and the mud cake when the downhole tool string is deployed at a corresponding depth in the borehole via the model and indicates a location of one or more spacers to implement along the downhole tool string, a type of each of the one or more spacers, or both; selecting, using the design device, one of the plurality of candidate spacer configurations as a final spacer configuration based at least in part on an expected head tension to move the downhole tool string along the borehole when the downhole tool string is deployed with each of the plurality of candidate spacer configurations; and indicating, using the design device, the final spacer configuration to enable a manufacturing system to implement the one or more spacers along the downhole tool string based at least in part on the final spacer configuration before deployment in the borehole.

Another embodiment of the present disclosure describes a tangible, non-transitory, computer-readable medium that stores instructions executable by one or more processors in a design device to facilitate implementing a downhole tool string. The instructions include instructions to determine, using the one or more processors, a model that describes an expected relationship between properties of the downhole tool string, properties of a borehole in which the downhole tool string is expected to be deployed, properties of the sub-surface formation expected to surround the borehole, and properties of mud cake expected to be formed on a surface of the borehole; determine, using the one or more processors, a plurality of candidate spacer configurations each corresponding to a different depth in the borehole, in which each of the plurality of candidate spacer configurations is determined based at least in part on a contact force expected to occur at one or more contact points between the downhole tool string and the mud cake when the downhole tool string is deployed at a corresponding depth in the borehole via the model and indicates a location of one or more spacers to implement along the downhole tool string, a type of each of the one or more spacers, or both; select, using the one or more processors, one of the plurality of candidate spacer configurations as a final spacer configuration based at least in part on an expected head tension to move the downhole tool string along the borehole when the downhole tool string is deployed with each of the plurality of candidate spacer configurations; and indicate, using the one or more processors, the final spacer configuration to enable a manufacturing system to implement the one or more spacers along the downhole tool string based at least in part on the final spacer configuration before deployment in the borehole.

BRIEF DESCRIPTION OF THE DRAWINGS

Various aspects of this disclosure may be better understood upon reading the following detailed description and upon reference to the drawings, in which.

DETAILED DESCRIPTION

Figure 1:
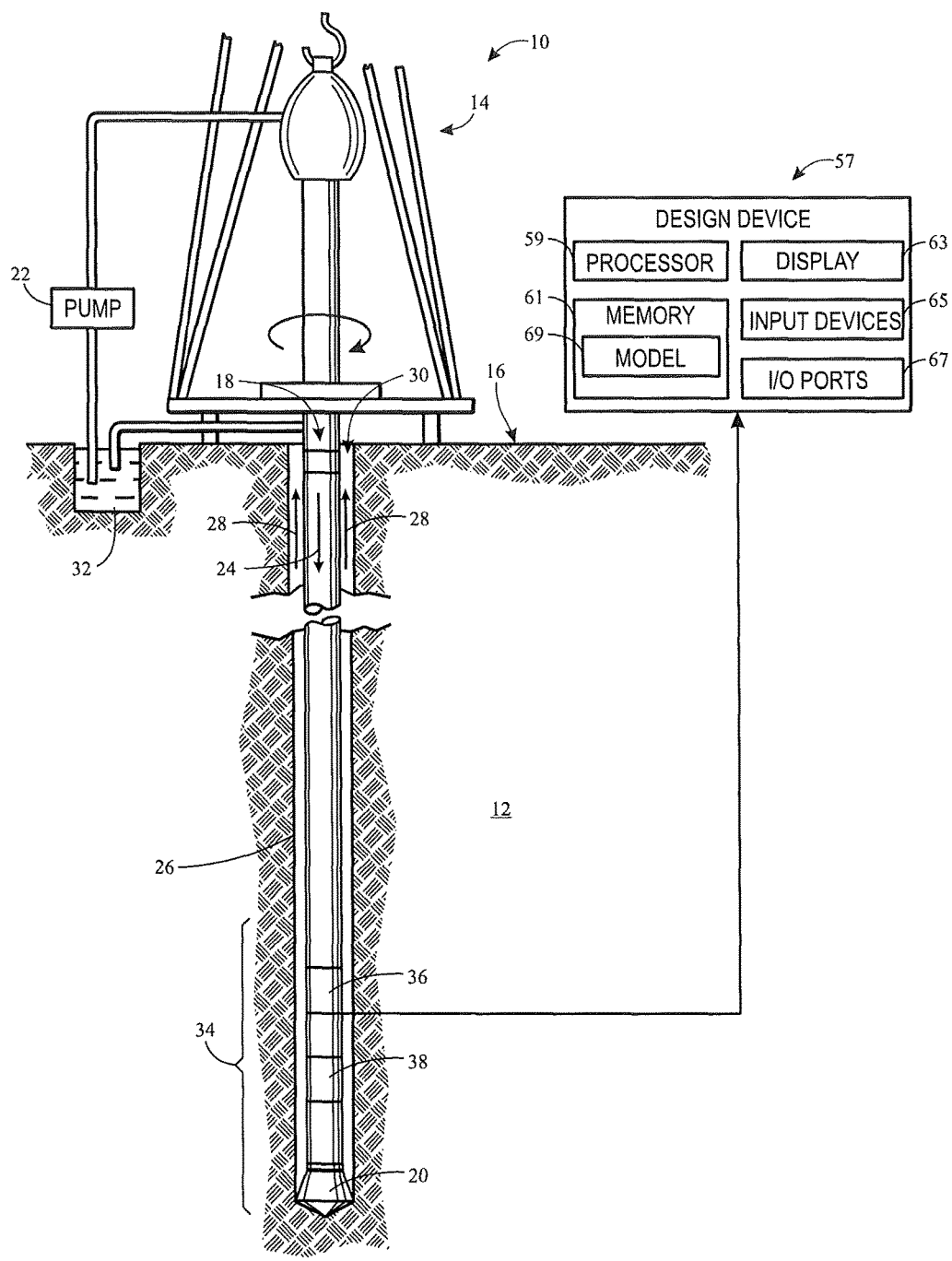
FIG. 1 is a schematic diagram of a drilling system including a downhole tool string, in accordance with an embodiment.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Generally, a downhole tool may be deployed in a borehole (e.g., wellbore) to facilitate determining characteristics of a sub-surface formation. In some instances, multiple downhole tools may be connected together to form a downhole tool string. Additionally, drilling mud may be pumped into the borehole. For example, the drilling mud may exert a mud pressure on the formation greater than a formation pressure, thereby reducing the likelihood of fluid from the formation flowing out into the borehole and/or out to the surface. Due to the differential pressure between the mud and formation, the liquid part of the drilling mud may invade the permeable areas of the formation while the solid part of the drilling mud is blocked by the formation, thereby forming mud cake on the surface of the borehole.

Thus, in some instances, a downhole tool string may come in contact with the mud cake. For example, when the borehole is deviated (e.g., slanted), gravity and/or the differential pressure may cause the downhole tool string to contact the mud cake. Even when the borehole is vertical, the differential pressure and/or eccentric force exerted on the downhole tool string may cause the downhole tool string to contact the mud cake.

However, in some instances, contact between the downhole tool string and mud cake may impede movement of the downhole tool string along the borehole. For example, the downhole tool string may be stationary while one or more downhole tools are taking measurements. Since liquid content is low, mud cake may quickly harden. In other words, when in contact and stationary for some time, the mud cake may quickly harden around contacting portions of the downhole tool string. After the downhole tool string is embedded in hardened mud cake, the force (e.g., head tension) required to move the downhole tool string may greatly increase.

In fact, in some instances, the required force may become so large that normal operating techniques may be insufficient to resume movement of the downhole tool string. In such instances, alternative techniques may be used to dislodge the downhole tool string from the mud cake. For example, a fishing operation, in which a grasping mechanism is lowered into the borehole and attached to the downhole tool string, may be performed. However, to utilize such alternative techniques, normal (e.g., drilling and/or logging) operations may be paused, thereby reducing productivity time.

When already in motion, the mud cake may not have sufficient time to harden around contacting portions of the downhole tool string. Nevertheless, the friction coefficient of the mud cake may be higher than the friction coefficient of the drilling mud, for example, due to lower liquid content. As such, when in contact the mud cake may exert a greater amount of fiction on the downhole tool string compared to the drilling mud. Since in motion, amount of contact between the downhole tool string and the mud cake may be constantly changing, thereby causing amount of force (e.g., head tension, etc.) to overcome friction to also change. Thus, force used to move the downhole tool string may be less predictable and may, in fact, cause uneven (e.g., jerky or yo-yo effect) movement that jostles downhole tools on the downhole tool string.

To reduce effect mud cake has on movement of the downhole tool string along the borehole, spacers may be attached to the downhole tool string to reduce contact area and, thus, contact force between the downhole tool string and the mud cake formed along the borehole wall. For example, when deployed while drilling, stabilizers (e.g., spacers) may be attached to the downhole tool string. Additionally, when deployed after drilling the borehole (e.g., via conveyance line), standoffs (e.g., spacers) may be attached to the downhole tool string. Generally, attaching a stabilizer and/or standoff may produce raised area along the downhole tool string, thereby increasing clearance between the housing of the downhole tool string and the borehole wall, thereby reducing the likelihood of the mud cake directly contacting the tool body.

Additionally, other types of spacers may be attached to a downhole tool string, for example, when deployed via a conveyance line. For example, a roller may be used as a spacer and may include a mechanical component (e.g., a wheel or a ball) that rotates around a central axis when an external force is exerted. When the mechanical component is in contact with the mud cake, friction force between a surface of the mechanical component and the surface of the mud cake may cause the mechanical component to rotate as the downhole tool string is moved along the borehole. Since the coefficient of friction resisting rotation of the mechanical component may be less than the sliding friction coefficient of the mud cake, force used to move the downhole tool string a travel distance in the borehole may be reduced when a roller is attached compared to when a standoff is attached.

However, attaching spacers to a downhole tool string may increase the implementation associated (e.g., manufacturing) cost of the downhole tool string. Thus, in some instances, number of spacers available for attachment to a downhole tool string may be more limited. Additionally, implementation associated cost of a roller may be much greater than implementation associated cost of a standoff. Thus, in some instances, number of rollers available for attachment to a downhole tool string may be more limited compared to number of standoffs available. Moreover, attaching too many spacers may begin to negate their provided technical benefit. For example, rollers may have a larger outer diameter than standoffs. As a result, with the attachment of rollers and standoffs, some standoffs may not be in contact with the borehole. Such standoffs may not be needed since they are not reducing the sliding friction between such standoffs and the borehole. Since they are not needed, in certain configurations, such standoffs may be removed.

Accordingly, the present disclosure provides techniques for improving placement of spacers (e.g., standoffs, stabilizers, and/or rollers) along a downhole tool string, for example, to reduce effect the mud cake has on restricting the movement (e.g., via sticking) of the downhole tool string along a borehole. In some embodiments, a design device may be used to determine design parameters for a downhole tool string, such as a spacer configuration that indicates location of one or more spacers to implement on the downhole tool string and/or type of the each of the one or more spacers.

In some embodiments, properties of the downhole tool string, properties of the mud cake, properties of the surrounding formation, and/or properties of the borehole may provide an indication of how each is expected to interact with its surroundings. Thus, in some embodiments, the design device may determine design parameters using a model, which describes the expected interaction based at least in part on expected relationship between properties of the downhole tool string, properties of the mud cake, properties of the surrounding formation, and/or properties of the borehole. For example, based on expected properties, the design device may use the model to determine contact parameters, such as location of contact points between the downhole tool string and the mud cake, number of contact points along the tool string, whether a contact point is with the housing or a spacer, and/or contact force at a contact point.

To facilitate determining a spacer configuration, in some embodiments, the design device may determine contact parameters expected to occur at various calibration locations along the borehole. In some embodiments, calibration locations may be selected based at least in part on deviation of the borehole and/or distance from other calibration locations along the borehole. For example, a candidate location along the borehole may be selected as a calibration location when angle difference between expected deviation at the candidate location and expected deviation at another calibration location is greater than an angle threshold and distance between the candidate location and the other calibration location is greater than a distance threshold.

Thus, based at least in part on the model and properties expected to be present at a calibration location, the model may determine a candidate spacer configuration corresponding with each calibration location. For example, by executing the model based on the expected properties, the design device may determine a contact force profile and place spacers along the downhole tool string based on the contact force profile. However, adding a spacer (e.g., a standoff or stabilizer) to the downhole tool string may change clearance between the downhole tool string housing and the mud cake, thereby also changing interaction with the mud cake.

Thus, in some embodiments, the candidate spacer configuration corresponding with a calibration location may be iteratively determined. For example, the design device may execute the model to determine a first contact force profile and a first spacer configuration based at least in part on the first contact force profile. Subsequently, the design device may re-execute the model with the first spacer configuration implemented to determine a second contact force profile and a second spacer configuration based at least in part on the second contact force profile.

In some embodiments, the design device may determine the candidate spacer configuration corresponding with the calibration location by iteratively determining spacer configurations until number of spacers is less than or equal to available spacers. Additionally or alternatively, the design device may determine the candidate spacer configuration corresponding with the calibration location by iteratively determining spacer configurations until a contact metric determined based on the contact parameters is less than a contact metric threshold. In this manner, the design device may determine a candidate spacer configuration corresponding with each calibration location along the borehole.

Based at least in part on the candidate spacer configurations, the design device may determine a final spacer configuration to be implemented on the downhole tool string, for example, by a manufacturing tool (e.g., machine, equipment, or device) in a manufacturing system. To facilitate determining the final spacer configuration, the design device may determine expected head tension (e.g., force expected to be used to move the downhole tool string) when each candidate spacer configuration is implemented at each of the calibration locations. Additionally, in some embodiments, the design device may vary determination of the final spacer configuration based on whether available head tension is provided (e.g., known or considered).

For example, when available head tension is not provided, the design device may determine the largest (e.g., maximum) expected head tension associated with each of the candidate spacer configurations. In such embodiments, the design device may select the candidate spacer configuration with the smallest (e.g., minimum) maximum expected head tension as the final spacer configuration. On the other hand, when available head tension is provided, the design device may determine smallest (e.g., minimum) difference between the available head tension and the expected head tension associated with each of the candidate spacer configuration. In such embodiments, the design device may select the candidate spacer configuration with the largest (e.g., maximum) minimum head tension difference as the final spacer configuration.

Based at least in part on the final spacer configuration, spacers may be implemented on the downhole tool string before deployment in the borehole, for example, by indicating (e.g., communicating) the final spacer configuration to a manufacturing tool and/or a manufacturing system. In some instances, actual head tension resulting from implementing the final spacer configuration may differ from the expected head tension, for example, due to inaccuracy of the model and/or uncertainty in properties of the mud cake, the formation, and/or the borehole. Thus, in some embodiments, the design device may determine the actual head tension force, for example, using one or more tension sensors. Based at least in part on a comparison between the actual head tension and the expected head tension, the design device may update the model and/or properties in the model to facilitate improving determination of future spacer configurations. For example, the design device may determine friction coefficient along the borehole based at least in part on the comparison and update the model and/or the properties accordingly.

To help illustrate the techniques described herein, one embodiment of a drilling system 10 that may be used to drill a well through sub-surface formations 12, thereby forming a borehole 26 (e.g., wellbore), is shown in FIG. 1. In the depicted embodiment, a drilling rig 14 at the surface 16 may rotate a drill string 18, which includes a drill bit 20 at its lower end, to engage the sub-surface formations 12. To cool and/or lubricate the drill bit 20, a drilling fluid pump 22 may pump drilling mud 28 from a mud pit 32, through the center 24 of the drill string 18 to the drill bit 20. At the drill bit 20, the drilling mud 28 may then exit the drill string 18 through ports (not shown) and flow into the borehole 26. While drilling, the drilling mud 28 may be pushed toward the surface 16 through an annulus 30 between the drill string 18 and the formation 12, thereby carrying drill cuttings away from the bottom of the borehole 26. Once at the surface 16, the returned drilling mud 28 may be filtered and conveyed back to the mud pit 32 for reuse. Additionally, the drilling mud 28 may exert a mud pressure on the formation 12 to reduce likelihood of fluid from the formation 12 flowing into the borehole 26 and/or out to the surface 12.

Furthermore, as depicted, the lower end of the drill string 18 includes a downhole tool string 34 that includes various downhole tools, such a measuring-while-drilling (MWD) tool 36 and a logging-while-drilling (LWD) tool 38. Generally, the downhole tools (e.g., MWD tool 36 and LWD tool 38) may facilitate determining characteristics of the surrounding formation 12. For example, the LWD tool 38 may include an electrically operated radiation generator, which outputs radiation into the surrounding formation 12, and one or more sensors, which measures radiation returned from the surrounding formation 12, surrounding pressure, and/or surrounding temperature. Downhole tools may be also be deployed in the borehole 26 after the borehole 26 is drilled, for example, via a conveyance line.

Figure 2:
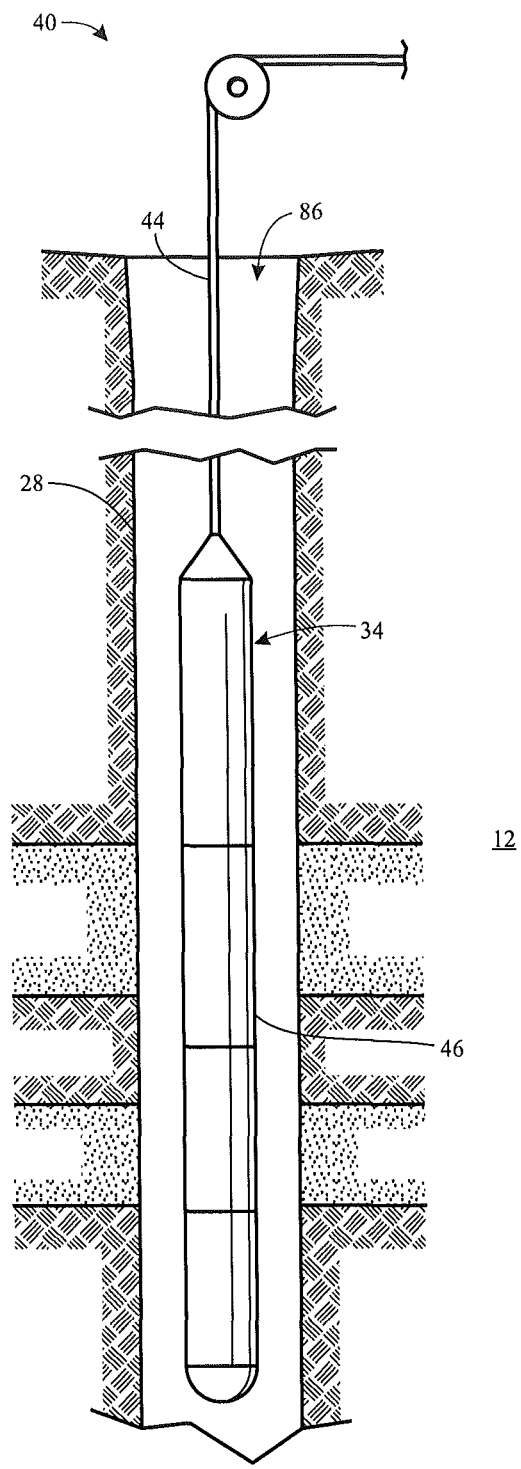
FIG. 2 is a schematic diagram of a conveyance line system including a downhole tool string, in accordance with an embodiment.

To help illustrate, a conveyance line system 40, which may be used to deploy downhole tools in the borehole 26, is shown in FIG. 2. In the depicted embodiment, the conveyance line system 40 includes a downhole tool string 34 with various downhole tools, such as a formation testing tool 46. Generally, the downhole tools (e.g., formation testing tool 46, etc.) may facilitate determining characteristics of the surrounding formation 12. For example, the formation testing tool 46 may include an electrically operated radiation generator, which outputs radiation into the surrounding formation 12, and one or more sensors, which measure radiation returned from the surrounding formation 12, the surrounding pressure, and/or the surrounding temperature.

Additionally, the conveyance line system 40 includes a cable 44 to facilitate controlling movement of the downhole tool string 34. In some embodiments, the conveyance line system 40 may be a wireline system when the cable 44 is an armed electrical cable that enables bi-directional communication between the downhole tool string 34 and the surface. In other embodiments, the conveyance line system 40 may be a slickline system when the cable 44 is used to support the downhole tool string 46, but does not provide direct communication between the downhole tool string 46 and the surface. Thus, in a wireline system or a slickline system, movement of the downhole tool string 34 may be controlled by exerting an upward force on the cable 44 to pull the downhole tool string 34 up the borehole 26 and/or by reducing force exerted on the cable 44 to enable gravity to pull the downhole tool string 34 down the borehole 24.

In other embodiments, the conveyance line system 40 may be a coil tubing system when the cable 44 is a coiled tube. In such embodiments, movement of the downhole tool string 34 may be controlled again by exerting an upward force on the cable 44 to pull the downhole tool string 34 up the borehole 26. To supplement force exerted by gravity, the cable 44 may also exert a downward force on the coiled cable 44 to push the downhole tool string 34 down the borehole 24. Thus, in some embodiments, using a coiled cable 44 may facilitate controlling movement of the downhole tool string 34 particularly when the borehole 24 is deviated (e.g., slanted away from vertical).

Even after drilling, the drilling mud 28 may remain in the borehole 26 to exert a mud pressure on the formation 12. In some embodiments, the mud pressure may be greater than the formation pressure to reduce likelihood of fluid from the formation 12 leaking into the borehole 26 and/or out to the surface. When porous, the mud pressure may cause the formation 12 to filter the drilling mud 28. More specifically, since greater than the formation pressure, the mud pressure may cause a liquid component (e.g., water) of the drilling mud 28 to follow into pores of the formation 12. When the pores are smaller than size of a particle component (e.g., dirt) of the drilling mud 28, the formation 12 may block the particle component. In such instances, a mud cake (e.g., particle component with decreased liquid component) may form along the surface of the borehole 26 and, thus, may contact the downhole tool string 34.

Figure 3:
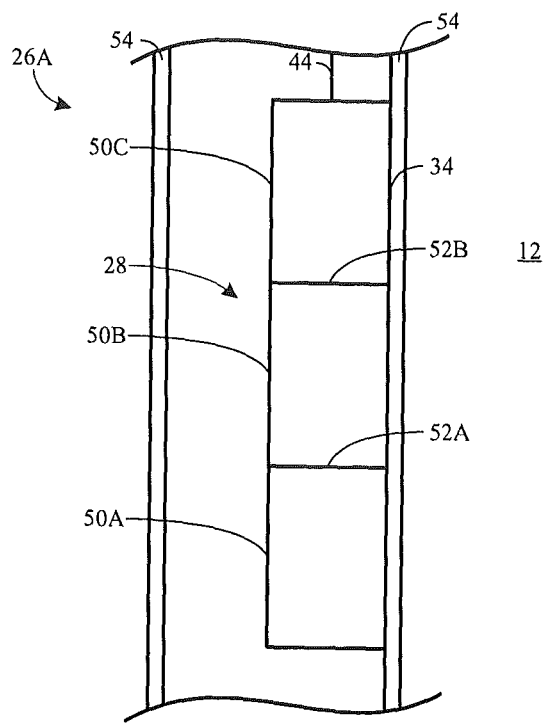
FIG. 3 is a schematic diagram of the downhole tool string of FIG. 2 in contact with mud cake in a vertical borehole, in accordance with an embodiment.
Figure 4:
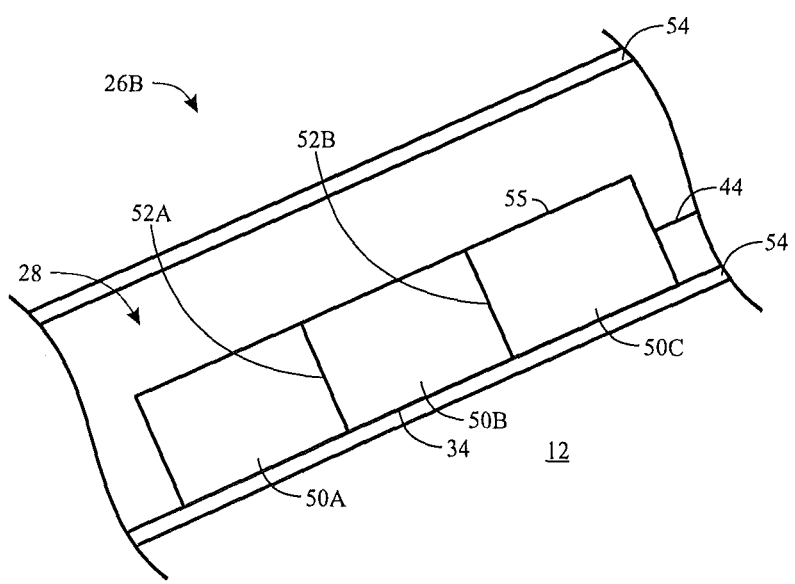
FIG. 4 is a schematic diagram of the downhole tool string of FIG. 2 in contact with mud cake in a deviated borehole, in accordance with an embodiment.

To help illustrate, downhole tool strings 34 deployed in two example boreholes 26 are shown in FIGS. 3 and 4. More specifically, FIG. 3 describes a substantially vertical borehole 26A and FIG. 4 describes a deviated (e.g., slanted) borehole 26B. As depicted in FIGS. 3 and 4, a cable 44 is coupled to the downhole tool string 34 and, thus, used in a conveyance line system 40. It should be noted that reference is made to a conveyance line system 40 to simplify discussion and is not intended to be limiting. One of ordinary skill in the art should recognize that the techniques described herein are also applicable for use in a drilling system 10.

As described above, the downhole tool string 34 may include multiple downhole tools 50. In some embodiments, the downhole tools 50 may be connected at field joints 52. For example, as depicted in FIGS. 3 and 4, the downhole tool string 34 includes a first field joint 52A connected between a first downhole tool 50A and a second downhole tool 52B and a second field joint 52B connected between the second downhole tool 50B and a third downhole tool 50C.

Additionally, as described above, drilling mud 28 may be disposed in the borehole 26 to exert a mud pressure on the formation 12 greater than the formation pressure. Furthermore, as described above, the mud pressure may cause the formation 12 to filter the liquid component of the drilling mud 28 from the solid component. As depicted in FIGS. 3 and 4, the solid component of the drilling mud 28 is blocked by the formation 12, thereby forming a mud cake 54 along the surface of the borehole 26.

Furthermore, as described above, the downhole tool string 34 may come in contact with the mud cake 54. For example, as depicted in FIG. 3, the downhole tool string 34 comes in contact with mud cake 54 formed along a right surface of the vertical borehole 26A. Although substantially vertical, the downhole tool string 34 may come in contact with the mud cake 54 when an off-center force is exerted on the downhole tool string 34, for example, due to force exerted by the cable 44 and/or the mud pressure.

Additionally, as depicted in FIG. 4, the downhole tool string 34 comes in contact with mud cake 54 formed along a bottom surface of the deviated borehole 26B. The downhole tool string 34 may come in contact with the mud cake 54 due to force exerted by gravity. In addition to gravity, the mud pressure may also push the downhole tool string 34 toward the mud cake 54.

As depicted in FIGS. 3 and 4, housing 55 of the downhole tool string 34 is substantially uniform. Since relatively rigid, when the housing 55 contacts the mud cake 54 it may be for an extended length of the downhole tool string 34. Since friction force is largely based on contacting surface area, force (e.g., head tension) used to move the downhole tool string 34 along the borehole 26 may greatly increase when the housing 55, which has a large surface area, is directly in contact with the mud cake 54.

Figure 5:
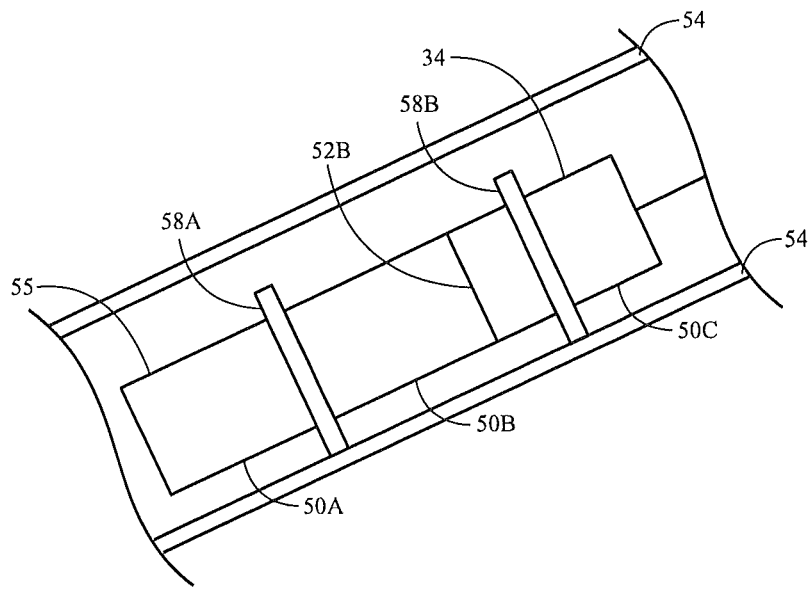
FIG. 5 is a schematic diagram of standoffs attached to the downhole tool string of FIG. 2, in accordance with an embodiment.
Figure 6:
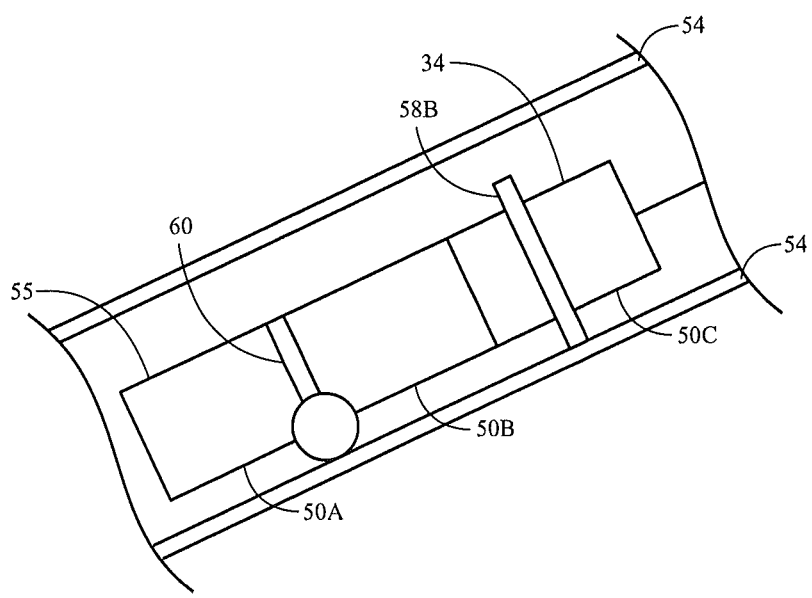
FIG. 6 is a schematic diagram of a roller and a standoff attached to the downhole tool string of FIG. 2, in accordance with an embodiment.

To facilitate reducing force used to move the downhole tool string 34, spacers may be attached to the downhole tool string 34 to increase clearance between the housing 55 and the mud cake 54. Examples of spacers that may be attached to the downhole tool string 34 are shown in FIGS. 5 and 6. More specifically, FIG. 5 describes the downhole tool string 34 with standoffs 58 attached and FIG. 6 describes the downhole tool string with a combination of standoffs 58 and rollers 60 attached.

As depicted in FIG. 5, a first standoff 58A and a second standoff 58B are attached to the downhole tool string 34. In some embodiments, the standoffs 58 may be attached around the housing 55 of the downhole tool string 34, thereby producing a raise area along the downhole tool string 34. As such, a standoff 58 may come in contact with the mud cake 54 before the housing 55. In this manner, a standoff 58 may increase clearance between the mud cake 54 and the housing 55, thereby reducing likelihood of the housing 55 directly contacting the mud cake 54.

Additionally, in some embodiments, the standoffs 58 may be connected at field joint 52 locations. For example, in the depicted embodiment, the first standoff 58A is connected at the first field join 52A. However, in other embodiments, the standoffs 58 may be connected at any suitable location along the downhole tool string 34. For example, in the depicted embodiment, the second standoff 58B is connected at the third downhole tool 50C and not at a field joint 52.

In a drilling system 10, stabilizers may be used instead of standoffs 58. In some embodiments, a stabilizer may be a balloon attached around the housing 55 of the downhole tool string 34. As such, a stabilizer may function similarly to a standoff 58 by increasing clearance between the mud cake 54 and the housing 55. Thus, one of ordinary skill in the art should recognize the techniques describe with reference to standoffs 58 used in a conveyance line system 40 may be interchanged with stabilizers when used in a drilling system 10. For example, a standoff 58 and/or stabilizers may be attached to the conveyance line to reduce the direct contact of the conveyance line with the wellbore.

As depicted in FIG. 6, a roller 60 in incorporated onto the downhole tool string 34. In addition to increasing clearance between the mud cake 54 and the housing 55, the roller 60 may include a mechanical component (e.g., a wheel or a ball) that rotates about a central axis when in motion and in contact with the mud cake 54. As such, compared to a standoff 58, attaching a roller 60 to the downhole tool string 34 may further reduce force used to move the downhole tool string 34 along the borehole 26. Thus, in some embodiments, a roller 60 may be used instead of a standoff 58. In other embodiments, when a roller 60 has the same outer diameter of a standoff 58, a roller 60 may be used to supplement existing standoffs 58.

Similar to standoffs 58, in some embodiments, a roller 60 may be connected at field joint locations 52. For example, in the depicted embodiment, the roller 60 is connected at the first field join 52A. However, in other embodiments, the roller 60 may be connected at any suitable location along the downhole tool string 34. For example, in such embodiments, the second standoff 58B may additionally or alternatively be replaced with a roller 60.

In some embodiments, a manufacturing system (e.g., factor or plant) may include manufacturing tools that are used to assemble the downhole tool string 34 before deployment in the borehole 26. For example, the manufacturing system may attach spacers to the downhole tool string 34. However, determining location and/or type of spacers to attach to the downhole tool string 34 may include consideration of various factors. For example, since spacers are generally additional components attached to the downhole tool string 34, increasing number of spacers may increase implementation associated cost of the downhole tool string 34. Additionally, number of different types (e.g., standoffs 58 and rollers 60) of spacers available for use on the downhole tool string 34 may vary. Moreover, attaching too many stabilizers and/or standoffs may begin to negate their provided technical benefit. Thus, the manufacturing system may include a design device that performs certain processes, for example, to determine a spacer configuration that indicates the location and/or type of the spacers to attach to the downhole tool string 34 based at least in part on the various factors. Moreover, different downhole tool strings may have various different placements because of varying hole conditions (e.g., deviations, etc.).

Figure 7:
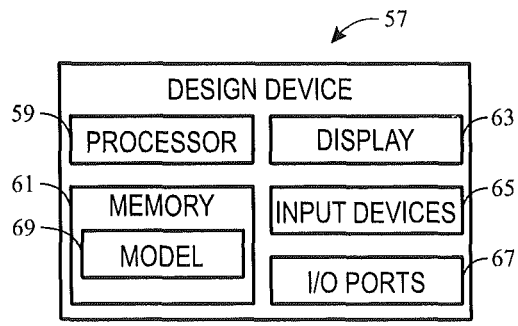
FIG. 7 is a block diagram of a design device, in accordance with an embodiment.

To help illustrate, one embodiment of a design device 57 that may be used in a manufacturing system is described in FIG. 7. As depicted, the design device 57 includes a processor 59, memory 61, a display 63, input device 65, and input/output (I/O) ports 67. Thus, the design device 57 may be any suitable electronic device, such as a handheld computing device, a tablet computing device, a notebook computer, a desktop computer, a workstation computer, a cloud-based computing device, or any combination of such devices.

In the depicted embodiment, the processor 59 may execute instruction stored in memory 59 to perform operations, such determining a spacer configuration. As such, in some embodiments, the processor 59 may include one or more general purpose microprocessors, one or more application specific processors (ASICs), one or more field programmable logic arrays (FPGAs), or any combination thereof. Additionally, the memory 61 may be a tangible, non-transitory, computer-readable medium that store instructions executable by and data to be processed by the processor 59. For example, in the depicted embodiment, the memory 61 may store a model 69 that describes interaction between the downhole tool string 34, the formation 12, the borehole 26, and/or the mud cake 54. Thus, in some embodiments, the memory 61 may include random access memory (RAM), read only memory (ROM), rewritable non-volatile memory, flash memory, hard drives, optical discs, and the like.

Furthermore, I/O ports 67 may enable the design device 67 to interface with various other electronic devices. For example, the I/O ports 67 may enable the design device 67 to communicatively couple to a network, such as a personal area network (PAN), a local area network (LAN), and/or a wide area network (WAN). Accordingly, in some embodiments, the design device 57 may receive the model 69 from another electronic device and/or communicate a determined spacer configuration to another electronic device (e.g., a manufacturing tool) via the I/O ports 67, for example, to enable the manufacturing system to implement the spacer configuration when assembling the downhole tool string 34.

Additionally, the input devices 65 may enable a user to interact with the design device 57, for example, to input properties and/or input instructions (e.g., control commands). Thus, in some embodiments, the input device 65 may include buttons, keyboards, mice, trackpads, and the like. Additionally or alternatively, the display 63 may include touch components that enable user inputs to the design device 57 by detecting occurrence and/or position of an object touching its screen (e.g., surface of the display 63). In addition to enabling user inputs, the display 63 may present visual representations of information, such as a final spacer configuration, one or more candidate spacer configurations, one or more contact force profiles, and/or one or more head tension profiles to facilitate implementation (e.g., assembly) by the manufacturing system.

As described above, the design device 57 may use the model 69 to facilitate determining the location and/or type of spacers to attach to the downhole tool string 34. In some embodiments, the model 69 may be finite element analysis (FEA) model. Additionally, in some embodiments, the model 69 may describes expected interaction between the downhole tool string 34, the mud cake 54, the formation 12, and/or the borehole 26. In some embodiments, properties of the downhole tool string 34, properties of the mud cake 54, properties of the formation 12, and/or properties of the borehole 26 may provide an indication of how each is expected to interact with its surroundings and, thus, be an input to the model 69.

For example, the properties of the downhole tool string 34 may include expected length of the downhole tool string 34, expected weight of the downhole tool string 34, expected size of the housing 55, expected weight distribution along the downhole tool string 34, expected material composition of the housing 55, expected rigidity of the material composition, expected type of downhole tools 55 included in the downhole tool string 34, expected location of spacers to be attached to the downhole tool string, expected size (circumference and/or geometry) of each spacer to be attached to the downhole tool string 34, expected type (e.g., stabilizer, standoff 58, or roller 60) of each spacer to be attached to the downhole tool string 34, and/or the like. Additionally, the properties of the mud cake 54 may include expected material composition of the mud cake 54, expected thickness of the mud cake 54, and/or the like. Furthermore, the properties of the formation 12 may include expected permeability of the formation 12, expected porosity of the formation 12, and/or the like. The properties of the borehole 26 may include the expected deviation (e.g., degrees from vertical) of the borehole 26, expected width of the borehole, expected size (e.g., circumference) of borehole 26, expected azimuth of the borehole 26, and/or the like.

Using the model 69, the design device 57 may determine contact parameters at expected contact points between the downhole tool string 34 and the mud cake 54. In some embodiments, the contact parameters may include location of contact points, number of contact points, what part (e.g., standoff 58, roller 60, and/or housing 55) of the downhole tool string 34 is at the contact point, contact force at each contact point, and/or the like. Based at least in part on the contact parameters, the design device 57 may operate to determine location and/or type of spacers to be attached to the downhole tool string 34.

Figure 8:
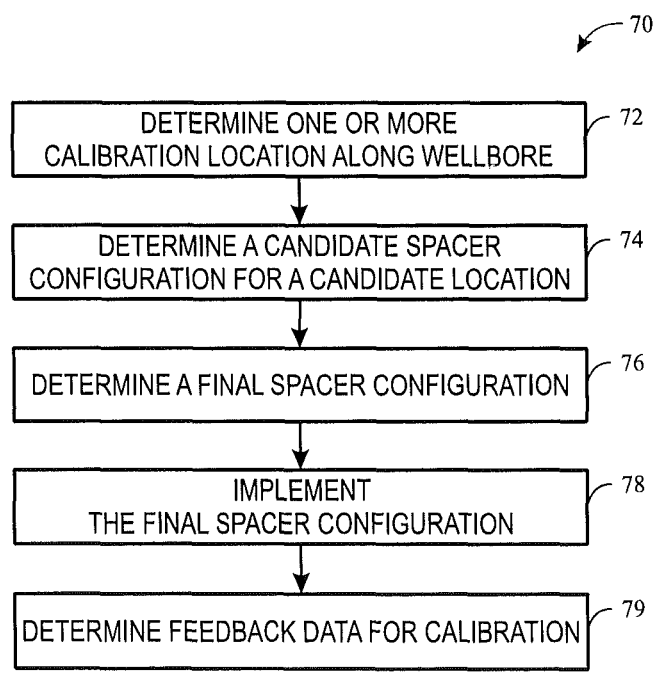
FIG. 8 is a flow diagram of a process for determining, implementing, and calibrating a spacer configuration on a downhole tool string, in accordance with an embodiment.

To help illustrate, one embodiment of process 70 for operating a design device 57 is described in FIG. 8. Generally, the process 70 includes determining one or more calibration locations along the borehole (process block 72), determining a candidate spacer configuration for a candidate location (process block 74), determining a final spacer configuration (process block 76), implementing the final spacer configuration (process block 78), and determining the feedback data for calibration (process block 79). In some embodiments, the process 70 may be implemented by executing instructions stored in one or more tangible, non-transitory, computer-readable media, such as memory 62, using processing circuitry, such as processor 59.

Accordingly, in some embodiments, the design device 57 may determine one or more calibration locations along the borehole 26 (process block 72). In some embodiments, calibration locations may be used to determine candidate spacer configurations. Additionally, in some embodiments, calibration locations may be selected based at least in part on expected deviation of the borehole at the calibration locations and/or distance between the calibration locations.

Figure 9:
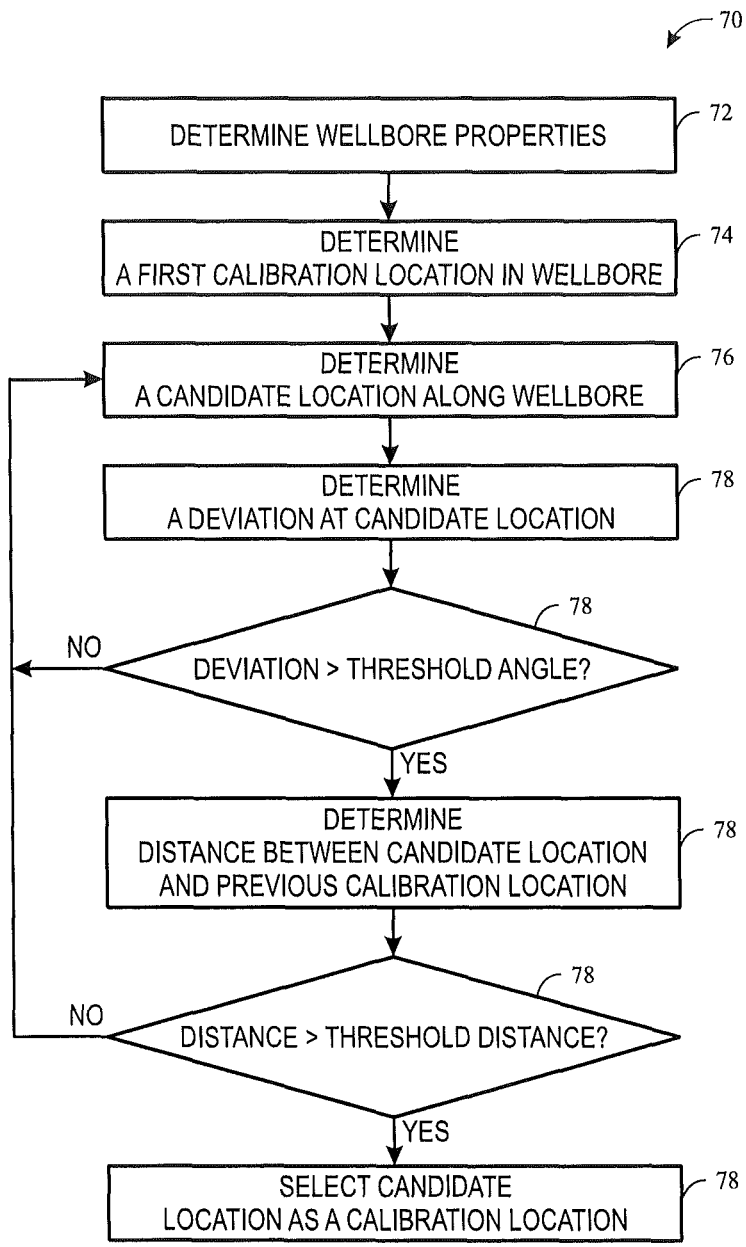
FIG. 9 is a flow diagram of a process for determining calibration locations along a borehole, in accordance with an embodiment.

To help illustrate, one embodiment of a process 80 for determining calibration locations along a borehole 26 is described in FIG. 9. Generally, the process 80 includes determining borehole properties (process block 81), determining a first calibration location in the borehole (process block 82), determining a candidate location along the wellbore (process block 83), determining deviation at the candidate location (process block 84), determining a deviation difference between the deviation at the candidate location and deviation at a previous calibration location (process block 85), determining whether that deviation difference is greater than an angle threshold (decision block 86), determining distance between the candidate location and the previous calibration location (process block 87), determining whether the distance is greater than a distance threshold (decision block 88), and selecting the candidate location as a calibration location (process block 89) when the deviation difference is greater than the angle threshold or the distance is greater than the distance threshold. In some embodiments, the process 80 may be implemented be executing instructions stored in one or more tangible, non-transitory, computer-readable media, such as memory 62, using processing circuitry, such as processor 59.

Accordingly, in some embodiments, the design device 57 may determine properties of the borehole 26 (process block 81). As described above, the properties of the borehole 26 may include angle (e.g., degrees from vertical) of the borehole 26, size of borehole 26, azimuth of the borehole 26, and/or the like. In some instances, properties of shallow portions of the borehole 26 may be determined with relative certainty. However, properties of the borehole 26 may change over its length. As such, properties of deeper portions of the borehole 26 may be determined with less certainty. In other words, certainty of the properties of the borehole 26 may vary based on depth. In some embodiments, the properties of the borehole 26 may be manually entered into the design device 57 via the user inputs 65. Additionally or alternatively, the design device 57 may receive the properties of the borehole 26 from another electronic device (e.g., a sensor), for example, via the I/O ports 67.

Based at least in part on the properties of the borehole 26, the design device 57 may determine a first calibration location in the borehole (process block 82). In some embodiments, the design device 57 may select the first calibration location at a first depth in the borehole 26. For example, the first calibration location may be a distance threshold (e.g., 100 m) from the surface 16. In embodiments, the design device 57 may select the first calibration location at the surface 16 or at a depth location below the casing shoe. Additionally, in some embodiments, the design device 57 may store properties (e.g., depth, deviation, size, and/or asthmas) of the first calibration location, for example, in memory 61 to facilitate selecting subsequent calibration locations in the borehole 26.

To determine a next calibration location, the design device 57 may determine a candidate location in the borehole 26 based at least in part on the properties of the borehole 26 (process block 84). In some embodiments, the design device 57 may select the candidate location by progressing deeper into the borehole 26 from previously selected calibration locations. For example, to determine a second calibration location, the design device 57 may select the candidate location a second depth greater than the first depth in the borehole 26.

Additionally, the design device 57 may determine difference between deviation at the candidate location and deviation at a previously selected calibration location (process block 85). For example, to determine the second calibration location, the design device 57 may determine difference between deviation of the borehole 26 at the first calibration location and deviation of the borehole at the candidate location. Furthermore, the design device 57 may determine distance (e.g., length of the borehole 26) between the candidate location and the previously selected calibration location (process block 86). For example, to determine the second calibration location, the design device 57 may determine distances between the first depth of first calibration location and the second depth of the candidate location.

To determine whether to select the candidate location as a calibration location, the design device 57 may compare the deviation difference with an angle threshold (decision block 86). In some embodiments, the angle threshold and/or the distance threshold may be predetermined and stored, for example, in memory 61. Additionally, in some embodiments, the angle threshold and/or the distance threshold may be dynamically adjusted, for example, to control likelihood of a candidate location being selected as a calibration location. For example, increasing the angle threshold and/or the distance threshold may decrease likelihood of candidate locations being selected as calibration locations.

When the deviation difference is greater than the angle threshold (decision block 86) or the distance is greater than the distance threshold (decision block 88), the design device 57 may select the candidate location as a calibration location (process block 89). On the other hand, when the deviation difference is not greater than the angle threshold and the distance is not greater than the distance threshold, the design device 57 may select another candidate location (arrow 83). In this manner, the design device 57 may iteratively select calibration locations, for example, until the bottom of the borehole 26 is reached. As such, after selecting the candidate location as a calibration location (process block 89), the process 80 determines the next candidate location until the bottom of the borehole 26 is reached.

Returning to the process 70 of FIG. 8, the design device 57 may determine candidate spacer configurations based at least in part on the calibration locations (process block 74). In some embodiments, each candidate spacer configuration may indicate location of one or more spacers (e.g., standoffs 58 or rollers 60) and/or spacer type of each of the one or more spacers. Additionally, in some embodiments, the design device 57 may determine a candidate spacer configuration corresponding to each of the calibration locations. Furthermore, in some embodiments, the design device 57 may iteratively determine a candidate spacer configuration based at least in part on contact parameters expected to result from deploying the downhole tool string with different spacer configurations. For example, it may be determined that there should be eight calibration locations at various points along the wellbore 26, where the eights spacers should be arranged in a way such that a first configuration designates the first four spacers are standoffs and the next four are rollers. A second configuration designates the first two spacers as rollers and the next 6 as standoffs. Similarly, different configurations would be determined for each of the eight configurations. As a further example, the design device 57 may iteratively adjust an initial spacer configuration by adding a spacer, removing a spacer, and/or moving a spacer based on a contact force profile expected to result from deploying the downhole tool with the initial spacer configuration. In such embodiments, the design device 57 may set the candidate spacer configuration as a spacer configuration expected to result in a contact metric (e.g., total contact force, number of contact points, and/or housing contact points) that meets a contact metric threshold.

Figure 10:
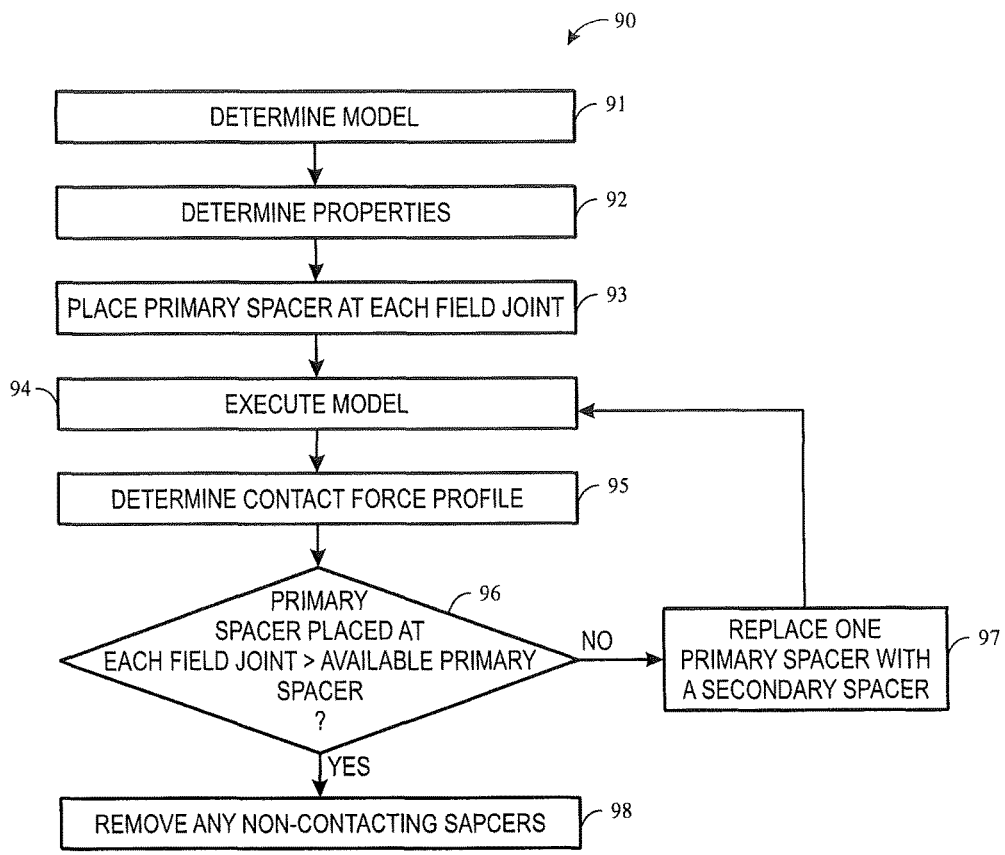
FIG. 10 is a flow diagram of a process for determining a candidate spacer configuration corresponding to each of the calibration location, in accordance with an embodiment.

To help illustrate, one embodiment of a process 90 for determining a candidate spacer configuration associated with a calibration location is described in FIG. 10. Generally, the process 90 includes determining a model (process block 91), determining an initial spacer configuration (process block 92), determining expected properties at a calibration location (process block 93), determining a contact parameter by executing a model (process block 94), determining whether the contact parameter meets a parameter threshold (decision block 96), adjusting the initial spacer configuration when the contact parameter does not meet the parameter threshold (process block 97), and selecting the initial spacer configuration as a candidate spacer configuration associated with the calibration location when the contact parameter meets the parameter threshold (process block 98). In some embodiments, the process 90 may be implemented by executing instructions stored in a tangible, non-transitory, computer-readable medium, such as the memory 61 or the like, using processing circuitry, such as the processor 59 or the like.

Accordingly, in some embodiments, the design device 57 may determine the model 69 (process block 91). When stored in memory 61, the design device 57 may retrieve the model 69 from memory 61. Additionally or alternatively the design device 57 may receive the model 69 from another electronic device, for example, via the I/O ports 67.

Additionally, the design device 57 may determine an initial spacer configuration (process block 92). In some embodiments, the initial spacer configuration may indicate placing a primary type of spacer at each field joint 52 along the downhole tool string 34. For example, the primary type of spacer may be rollers 60 while a secondary type of spacer is a standoff 58.

Furthermore, the design device 57 may determine expected properties of the downhole tool string 34, the borehole 26, the mud cake 54, and/or formation surrounding the borehole 26 (process block 93). In some embodiments, properties of the downhole tool string 34 may include length of the downhole tool string 34, weight of the downhole tool string 34, size of the housing 55, weight distribution along the downhole tool string 34, material composition of the housing 55, rigidity of the housing 55, type of downhole tools 55 included in the downhole tool string 34, spacer configuration (e.g., stabilizer, standoff 58, or roller 60), size (circumference and/or geometry) of each spacer, and/or the like. In some embodiments, the properties of the downhole tool string 34 may be directly measured while on the surface 16, for example, in the manufacturing system. Thus, the properties of the downhole tool string 34 may be determined with relative certainty. In some embodiments, the properties of the downhole tool string 34 may be manually entered into the design device 57 via the user inputs 65 (process block 92). Additionally or alternatively, the design device 57 may receive the properties of the downhole 34 from another electronic device (e.g., a sensor), for example, via the I/O ports 67.

Additionally, in some embodiments, properties of the formation 12 may include permeability of the formation 12, porosity of the formation 12, and/or the like. When deep under the surface 16, properties of the formation 12 may be difficult to directly determine, particularly since the downhole tools 50 used to determine the properties of the formation 12 are part of the downhole tool string 34 and, thus, not yet deployed. As such, the properties of the formation 12 may include some uncertainty and error that may be mitigated via the use of a spacer configuration validation feedback process. In some embodiments, the properties of the formation 12 may be manually entered into the design device 57 via the user inputs 65. Additionally or alternatively, the design device 57 may receive the properties of the formation 12 from another electronic device (e.g., a sensor), for example, via the I/O ports 67.

Furthermore, in some embodiments, properties of the mud cake 54 may include material composition of the mud cake 54, thickness of the mud cake 54, and/or the like. Thus, in some embodiments, the properties mud cake 54 may be dependent on at least properties of drilling mud 58 in the borehole 26, mud pressure, pumping pressure with which the drilling mud 58 is pumped into the borehole, and/or properties of the formation 12 (e.g., porosity). Properties of the drilling mud 28 may be determined on the surface 16 with relative certainty, but may change as the drilling mud 28 follows in the borehole 26. Additionally, since based on properties of the formation 12, the properties of the mud cake 54 may also include some uncertainty. In some embodiments, the properties of the mud cake 54 may be manually entered into the design device 57 via the user inputs 65. Additionally or alternatively, the design device 57 may receive the properties of the mud cake 54 from another electronic device (e.g., a sensor), for example, via the I/O ports 67.

Moreover, properties of the borehole 26 may include angle (e.g., degrees from vertical) of the borehole 26, size of borehole 26, asthmas of the borehole and/or the like along the length of the borehole 26. In some instances, properties of shallow portions of the borehole 26 may be determined with relative certainty. However, properties of the borehole 26 may change over its length. As such, properties of deeper portions of the borehole 26 may be determined with less certainty. In other words, certainty of the properties of the borehole 26 may vary based on depth. In some embodiments, the properties of the borehole 26 may be manually entered into the design device 57 via the user inputs 65. Additionally or alternatively, the design device 57 may receive the properties of the borehole 26 from another electronic device (e.g., a sensor), for example, via the I/O ports 67.

Based at least in part on the expected properties, the design device 57 may execute the model to determine contact parameters (process block 94). In some embodiments, the contact parameters may be determined based at least in part on a contact force profile output from the model when the expected properties are input. Additionally, in some embodiments, the contact parameters may include number of contact points between the downhole tool string 34 and the mud cake 54, contact force at one or more of the contact points, total contact force across the length of the downhole tool string 34, number of contact points between the housing and the mud cake 54, and/or largest contact force as a contact point.

To determine whether to select an initial spacer configuration as the candidate spacer configuration associated with the calibration location, the design device 57 may determine whether the contact parameter meets a parameter threshold (decision block 96). In some embodiments, a threshold number of contact points, a threshold total contact force across the length of the downhole tool string 34, and/or a contact force threshold may be determined by the design device 57. Additionally, in some embodiments, the contact parameter threshold may be predetermined and stored, for example, in memory 61.

In determining whether the contact parameters meet the parameter threshold (decision block 96), the design device also may identify the available resources. Such resources may include spacers (e.g., number of rollers 60 and standoffs 58). In certain embodiments, the available spacers may be inputs into the design device 57 and may set the constraints of decision block 96. If the available spacers (e.g., a contact parameter) do not match the required spacers (e.g., a contact parameter threshold), the design device may adjust the initial spacer configuration based at least in part on these contact parameters (process block 97). In doing so, the design device 57 may set a constraint for required spacers and compare the required spacers to the available spacers. Furthermore, a replacing strategy is executed by the design device 57 when a constraint is exceeded (e.g., the placement of required spacers on the downhole tool string exceeds the available spacers). In such case, based on a removing strategy, the replacement of the required spacers may result if other spacers are available. For example, if the required primary type of spacers (e.g., rollers 60) exceeds the available number of primary types of spacers, the primary types of spacers may be replaced by secondary types of spacer (e.g., standoff 58), based on a removing strategy. Furthermore, the design device 57 may execute a removing strategy when the spacers are not needed (e.g., the spacers are not in contact with the bore hole).

In further embodiments, when not meeting the contact parameter threshold, the design device 57 may adjust the initial spacer configuration based at least in part on the contact parameter (process block 97). In some embodiments, the design device 57 may adjust the initial spacer configuration by adding one or more spacers, removing one or more spacers, and/or changing position of one or more spacers along the downhole tool string 34, as discussed in detail above. For example, the design device may replace a primary type of spacer (e.g., roller 60) expected to have a lowest friction force with a secondary type of spacer (e.g., standoff 58). In this manner, the design device 57 may iteratively update the initial spacer configuration.

On the other hand, the design device 57 may select the initial spacer configuration expected to result in meeting the contact parameter threshold as the candidate spacer configuration associated with the calibration location (process block 98). Additionally or alternatively, the design device 57 may select the initial spacer configuration as the candidate spacer configuration associated with the calibration location when implementable by available spacers. For example, the design device 57 may set the initial spacer configuration as the candidate spacer configuration when number of rollers 60 included in the initial spacer configuration is less than or equal to number of available rollers 60. Furthermore, in some embodiments, the design device 57 may remove spacers not expected to contact the mud cake 54 at the calibration location, which facilitates reducing implementation associated cost of the downhole tool string 34. In this manner, the design device 57 may determine a candidate spacer configuration associated with each of the calibration locations selected.

Returning to the process 70 of FIG. 8, the design device 57 may determine a final spacer configuration based at least in part on the candidate spacer configurations (process block 76). In some embodiments, the design device 57 may select one of the candidate spacer configurations as the final spacer configuration based at least in part on head tension expected to be used to move the downhole tool string 34 with each of the candidate spacer configurations implemented. Additionally, in some embodiments, the design device 57 may use a different technique to select the final spacer configuration depending on whether head tension expected to be available to move the downhole tool string 34 along the borehole 26 is considered (e.g., provided or known).

Figure 11:
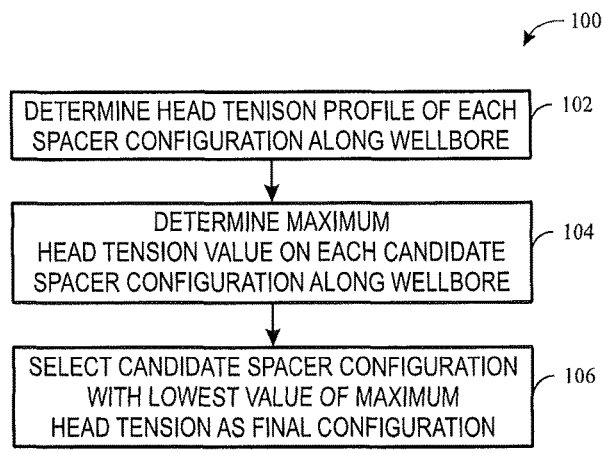
FIG. 11 is a flow diagram of a process for determining a final spacer configuration without using available conveyance tension, in accordance with an embodiment.

To help illustrate, one embodiment of a process 100 for determining a final spacer configuration without considering available head tension is described in FIG. 11. Generally, the process 100 includes determining a head tension profile associated with each candidate spacer configuration (process block 102), determining a maximum head tension associated with each of the head tension profiles (process block 104), and selecting a candidate spacer configuration with lowest maximum head tension as the final spacer configuration (process block 106). In some embodiments, the process 100 may be implemented by executing instructions stored in one or more tangible, non-transitory, computer-readable media, such as memory 61, using processor 59.

Accordingly, in some embodiments, the design device 57 may determine a head tension profile associated with each of the candidate spacer configuration (process block 100). In some embodiments, the head tension profile associated with a candidate spacer configuration may indicate head tension expected to be used to the downhole tool string 34 at each of the calibration locations with the candidate spacer configuration implemented. Additionally, in some embodiments, the head tension profile associated with a candidate spacer configuration may be output from the model when expected properties expected to be present are input.

Figure 12:
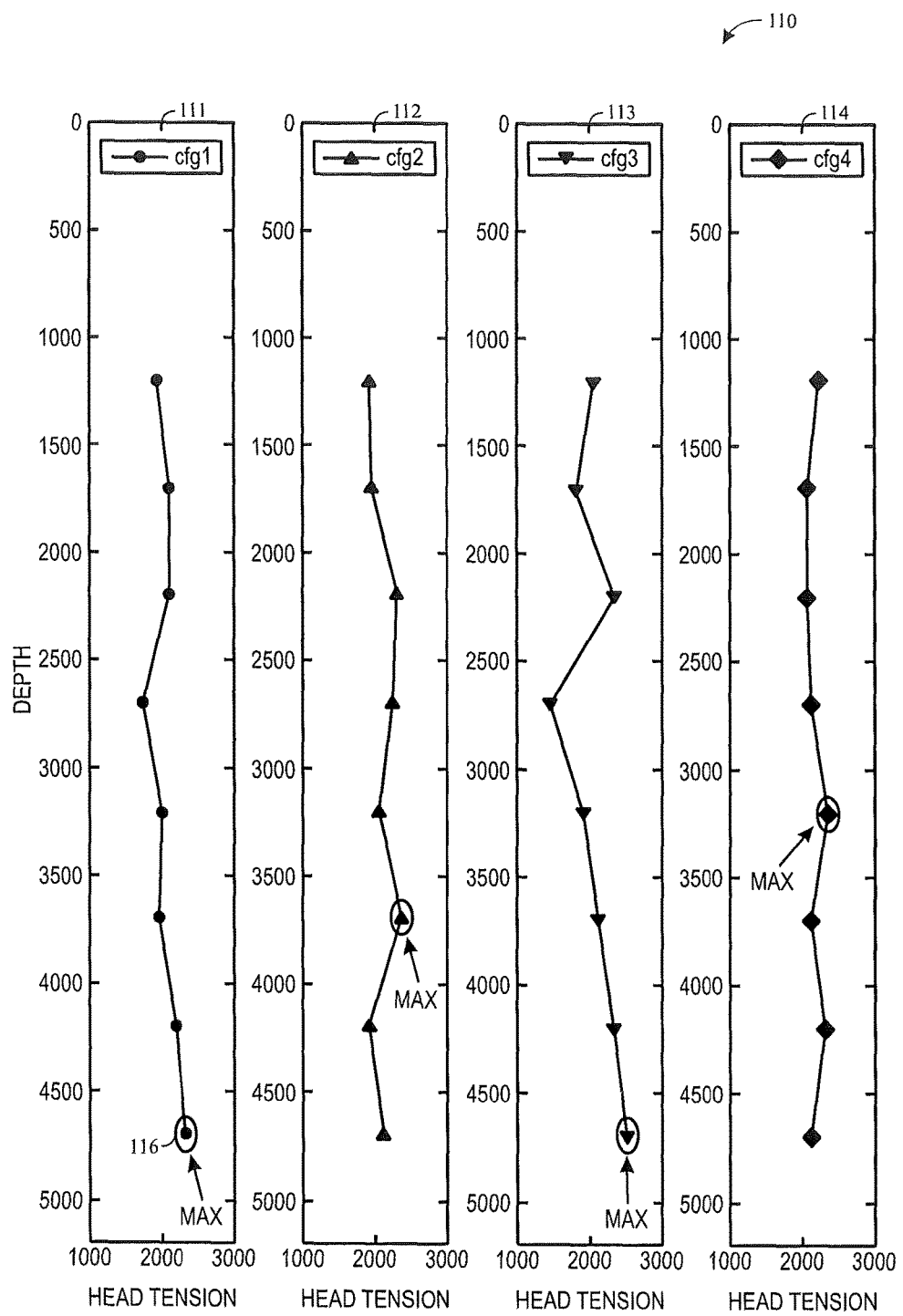
FIG. 12 is a plot of head tension at each of the calibration locations expected to result from multiple candidate spacer configurations, in accordance with an embodiment.

To help illustrate, plots 110 of head tension profiles expected to result from deploying a downhole tool string 34 with each of multiple candidate spacer configurations are shown in FIG. 12. In the depicted embodiment, a first plot 111 indicates head tension expected to result when the downhole tool string 34 with a first candidate spacer configuration implemented at each of eight calibration locations in the borehole 26. Additionally, a second plot 112 indicates head tension expected to result when the downhole tool string 34 with a second candidate spacer configuration implemented at each of the eight calibration locations in the borehole 26. A third plot 113 indicates head tension expected to result when the downhole tool string 34 with a third candidate spacer configuration implemented at each of the eight calibration locations in the borehole 26. Furthermore, a fourth plot 114 indicates head tension expected to result when the downhole tool string 34 with a fourth candidate spacer configuration implemented at each of the eight calibration locations in the borehole 26. In some embodiments, the head tension profiles may be output from the model based at least in part on expected properties as each of the calibration locations.

In more detail, each of the four plots illustrated in FIG. 12 contain eight calibration points all located at the same depths along the downhole tool string 34. All four plots contain a first point at depth 1180 m, a second point at depth 1710 m, and eighth point at depth 4750 m. However, all of the configurations have different head tension values, where the configuration corresponding to plot 111 has a first head tension value of 2100N, the configuration corresponding to plot 112 has a first head tension value of 2000N, the configuration corresponding to plot 113 has a first head tension value of 2200N, and the configuration corresponding to plot 114 has a first head tension value of 2350N. These variations in head tension profile may results due to using different spacer configuration, varying deviations from the horizontal as the downhole tool string 34 progresses downhole, and the like.

Returning to the process 100 of FIG. 11, the design device 57 may determine a maximum head tension on each of the head tension profiles. For example, with regard to FIG. 12, the first candidate spacer configuration has a first maximum head tension value 116 of approximately 2320N at a depth of approximately 4750 m. In a similar manner, the design device 57 may determine a second maximum head tension associated with the second candidate spacer configuration, a third maximum head tension associated with the third candidate spacer configuration, and fourth maximum head tension associated with the fourth candidate spacer configuration.

Returning to the process 100 of FIG. 11, the design device 57 may select a candidate spacer configuration associated with the lowest (e.g., minimum) of the maximum head tensions corresponding with teach of the candidate spacer configurations (process block 106). For example, the design device 57 may select the first candidate spacer configuration as the final spacer configuration since its associated maximum head tension is less than the maximum head tensions associated with each of the other candidate spacer configurations. In this manner, the design device 57 may determine a final spacer configuration based at least in part on expected head tension without consideration for available head tension.

Figure 13:
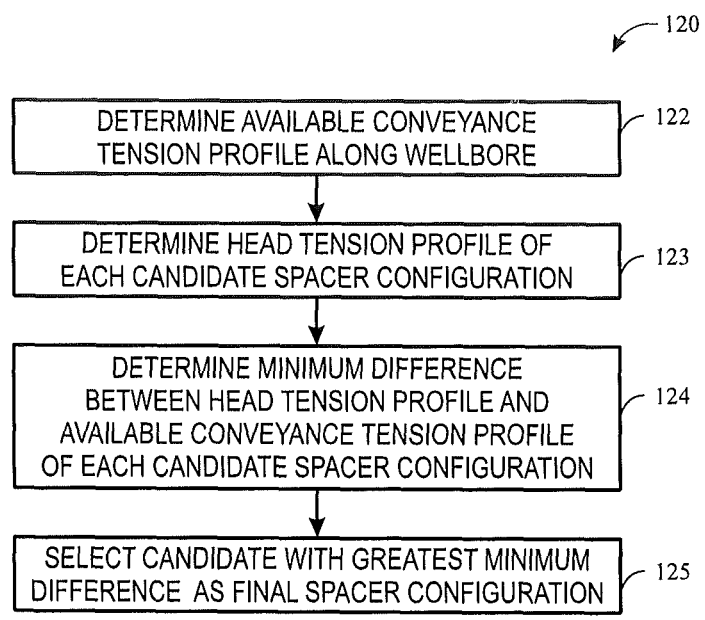
FIG. 13 is a flow diagram of a process for determining a final spacer configuration based, at least in part, on available conveyance tension, in accordance with an embodiment.

One embodiment of a process 120 for determining a final spacer configuration with the available head tension considered is described in FIG. 13. Generally, the process 120 includes determining an available head tension profile (process block 122), determining an expected head tension profile associated with each spacer configuration (process block 123), determining minimum difference between the available head tension profile and each of the expected head tension profiles (process block 124), and selecting a candidate spacer configuration associated with greatest of the minimum differences as the final spacer configuration (process block 125). In some embodiments, the process 120 may be implemented by executing instructions stored in one or more tangible, non-transitory, computer-readable media, such as memory 61, using processing circuitry, such as processor 59.

Accordingly, in some embodiments, the design device 57 may determine an available head tension profile (process block 122) and a head tension profile associated with each of the candidate spacer configuration (process block 123). In some embodiments, the available head tension profile may indicate force (e.g., head tension) expected to be available to move the downhole tool string 34 along the borehole 26 at various depths. Additionally, in some embodiments, the available head profile may be determined based at least in part on strength of a conveyance mechanism, such as conveyance line 44.

Figure 14:
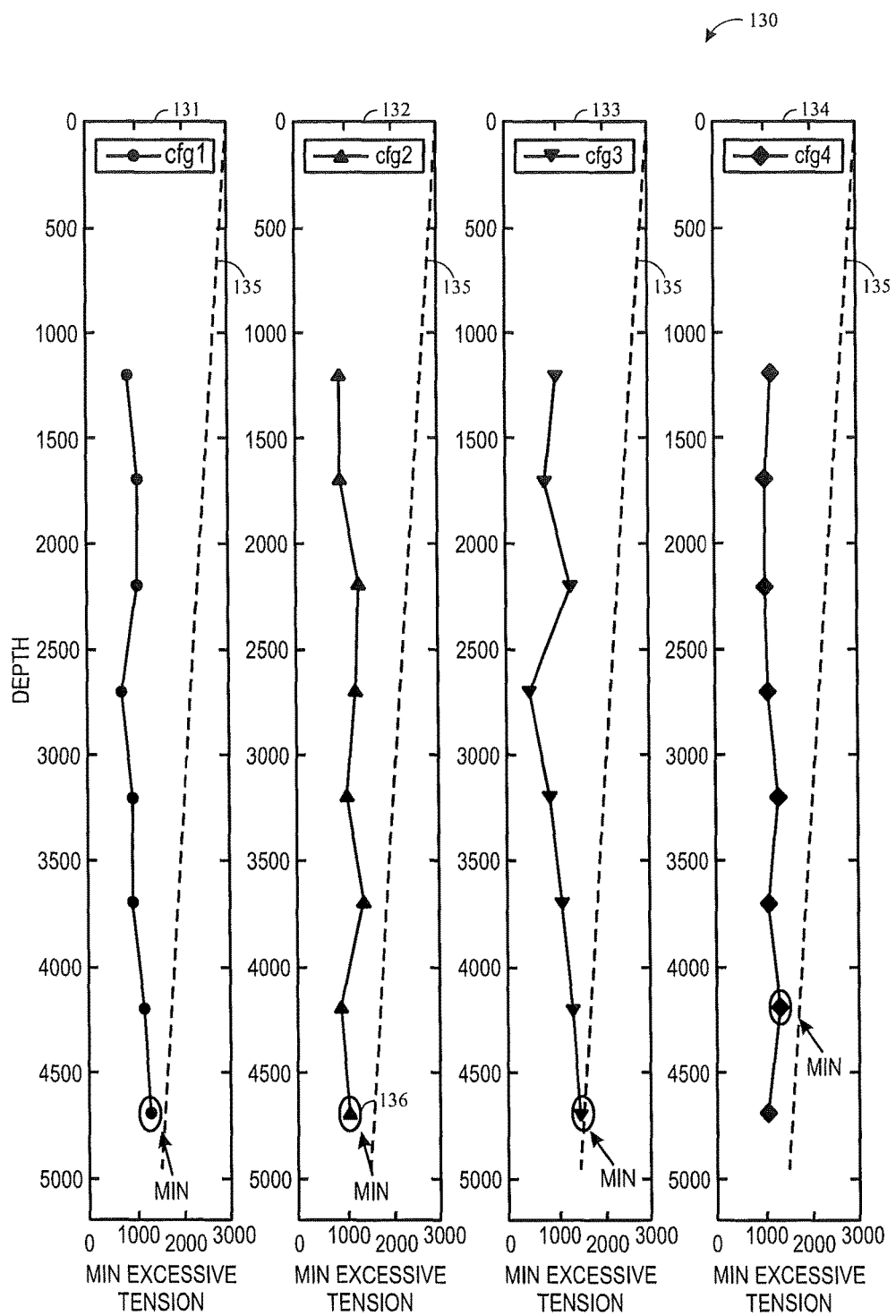
FIG. 14 is a plot of candidate spacer configurations, in accordance with an embodiment.

To help illustrate, plots 130 of an available head tension profile and each of multiple expected head tension profiles are shown in FIG. 14. In the depicted embodiment, a first plot 131 indicates an available head tension 135 and head tension expected to result when the downhole tool string 34 with a first candidate spacer configuration implemented at each of eight calibration locations in the borehole 26. Additionally, a second plot 132 indicates an available head tension 135 and head tension expected to result when the downhole tool string 34 with a second candidate spacer configuration implemented at each of the eight calibration locations in the borehole 26. A third plot 113 indicates an available head tension 135 and head tension expected to result when the downhole tool string 34 with a third candidate spacer configuration implemented at each of the eight calibration locations in the borehole 26. Furthermore, a fourth plot 114 indicates an available head tension 135 and head tension expected to result when the downhole tool string 34 with a fourth candidate spacer configuration implemented at each of the eight calibration locations in the borehole 26. In some embodiments, the head tension profiles may be output from the model based at least in part on expected properties as each of the calibration locations.

Returning to FIG. 13, process 120 determines the minimum difference between the available head tension profile and each of the expected head tension profiles (process block 124). As illustrated in FIG. 14, the minimum difference between the head tension profile and the available conveyance tension profile corresponding to each of the four configurations is circled on the respective four plots.

Returning to FIG. 13, the candidate spacer configuration associated with greatest of the minimum differences is selected as the final spacer configuration. FIG. 14 illustrates, the greatest minimum difference between the available head tension profile and the expected head tension profile occurs at the second plot 132 and is identified by circled value 136. The design device 57 may identify the minimum difference between the available head tension profile and the expected head tension profile and may be display results via display 63 as plots similar to those found in FIG. 14. In additional configurations, the greatest minimum difference between the available head tension profile and the expected tension profile for each configuration may be displayed as a numeric value specifying the configuration and depth it corresponds to, instead of a circled point on a plot, as illustrated. Additional methods for choosing the final spacer configuration may be implemented other than the process 120 of FIG. 13 with corresponding example illustrated by plot 130 of FIG. 14.

In any case, returning to the process 70 of FIG. 8, the design device 57 may indicate the final spacer configuration to facilitate implementing one or more spacers along the downhole tool string 34 before deployed in the borehole 26 (process block 78). In some embodiments, the design device 57 may instruct one or more manufacturing tools to attach spacers to the downhole tool string 34 in accordance with the final spacer configuration. In other embodiments, the design device 57 may display a visual representation of the final spacer configuration, which may then be used to attach spacers to the downhole tool string 34.

After the downhole tool string 34 is deployed with the final spacer configuration implemented, the design device 57 may use feedback data (process block 79). In some embodiments, the design device 57 may use the feedback data to update the model and/or expected properties input to the model. In some embodiments, the design device 57 may update the model to improve accuracy. Additionally, in some embodiments, the design device 57 may update the expected properties to reduce uncertainty.

Figure 15:
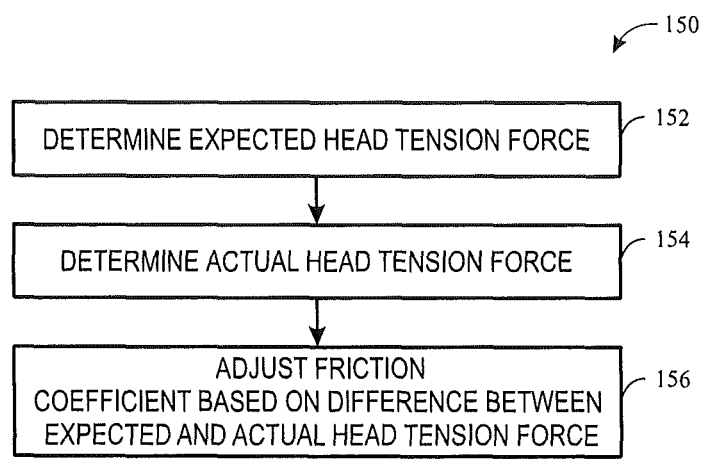
FIG. 15 is a flow diagram of a process for validating the final spacer configuration via a closed loop, in accordance with an embodiment.

To help illustrate, one embodiment of a process 150 for operating a design device 57 after a downhole tool string 34 is deployed with a final spacer configuration is described in FIG. 15. Generally, the process 150 includes determining an expected head tension (process block 152), determining an actual head tension recorded during deployment (process block 154), and adjusting the model and/or expected properties input to the model based at least in part on difference between the expected head tension and the actual head tension (process block 156). In some embodiments, the process 150 may be implemented by executing instructions stored in more or more tangible, non-transitory, computer-readable media, such as memory 61, using processing circuitry, such as processor 59.

Accordingly, in some embodiments, the design device 57 may determine expected head tension associated with the final spacer configuration implemented on the downhole tool string 34 (process block 152). As described above, in some embodiments, the head tension profile associated with the final spacer configuration may be previously determined to facilitate selecting the final spacer configuration from multiple candidate spacer configurations.

Additionally, the design device 57 may determine actual head tension used to move the downhole tool string 34 along the borehole 26 with the final spacer configuration implemented (process block 154). In some embodiments, the actual head tension may be determine based at least in part on sensor data received from one or more sensors.

By comparing the expected head tension and the actual head tension, the design device 57 may update (e.g., adjust) the model and/or expected properties input to the model (process block 156). For example, based at least in part on difference between the actual head tension and the expected head tension, the design device 57 may adjust friction coefficient of the mud cake input to the model. Additionally or alternatively, the design device 57 may adjust relationships described in the model based at least in part on the difference. In this manner, the design device 57 may improve accuracy of the model and/or reduce uncertainty in expected properties, thereby improving subsequently determined spacer configurations.

Accordingly, the technical effect of the present disclosure include improving implementation of spacers along a downhole tool string. In some embodiments, the present disclosure provides techniques for selecting one or more calibration locations at differing depths in a borehole based at least in part on distance between calibration locations and deviation of the borehole at the calibration locations. Additionally, in some embodiments, the present disclosure provides techniques to determine a candidate spacer configuration associated with each calibration location based at least in part on contact parameters expected to result from implementing the candidate spacer configuration. Furthermore, in some embodiments, the present disclosure provides techniques to determine a final spacer configuration by selecting from multiple candidate spacer configurations based at least in part on head tension expected to result from implementing each of the candidate spacer configurations. In this manner, the techniques of the present disclosure enable implementing one or more spacers on the downhole tool string 34 that reduces head tension expected to be used to move the downhole tool string 34 and/or likelihood of the expected head tension exceeding available head tension.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The invention claimed is:

1. A manufacturing system used to implement one or more spacers along a downhole tool string to be deployed in a borehole formed in a sub-surface formation, comprising:
   a manufacturing tool configured to attach the one or more spacers along the downhole tool string based at least in part on a final spacer configuration; and
   a design device configured to:
      determine a model that describes an expected relationship between properties of the downhole tool string, properties of the borehole, properties of the sub-surface formation, and properties of mud cake expected to be formed on a surface of the borehole;
      determine a plurality of calibration locations along the borehole based at least in part on the properties of the borehole;
      determine a plurality of candidate spacer configurations based at least in part on a contact force expected to occur at contact points between the downhole tool string and the mud cake when the downhole tool string is deployed with each of the plurality of candidate spacer configurations via the model; and
      determine the final spacer configuration based at least in part on an expected head tension to move the downhole tool string along the borehole when the downhole tool string is deployed with each of the plurality of candidate spacer configurations via the model.

2. The manufacturing system of claim 1, wherein, to determine the plurality of calibration locations, the design device is configured to:
   determine a first calibration location at a first depth in the borehole based at least in part on first properties of the borehole expected to be present at the first calibration location; and
   determine a second calibration location at a second depth in the borehole based at least in part on second properties of the borehole expected to be present at the second calibration location.

3. The manufacturing system of claim 2, wherein, to determine the second calibration location, the design device is configured to:
   determine a first deviation of the borehole indicated by the first properties of the borehole;
   determine a second deviation of the borehole indicated by the second properties of the borehole;
   determine a distance between the first calibration location and a candidate location; and
   select the candidate location as the second calibration location when the first deviation and the second deviation differ by more than an angle threshold or the distance between the first calibration location and the candidate location is greater than a distance threshold.

4. The manufacturing system of claim 1, wherein, to determine the plurality of candidate spacer configurations, the design device is configured to:
   determine a first candidate spacer configuration based at least in part on a first contact force profile output from the model, wherein the first contact force profile indicates the contact force expected to occur at one or more contact points between the downhole tool string and the mud cake when the downhole tool string is deployed at a first calibration location of the plurality of calibration locations in the borehole with the first candidate spacer configuration implemented;

determine a second candidate spacer configuration based at least in part on a second contact force profile output from the model, wherein the second contact force profile indicates the contact force expected to occur at a second one or more contact points between the downhole tool string and the mud cake when the downhole tool string is deployed at a second calibration location of the plurality of calibration locations in the borehole with the second candidate spacer configuration implemented.

5. The manufacturing system of claim 4, wherein, to determine the first candidate spacer configuration, the design device is configured to:

determine an initial spacer configuration;

determine a contact force profile output from the model, wherein the contact force profile indicates the contact force expected to occur at one or more contact points between the downhole tool string and the mud cake when the downhole tool string is deployed at the first calibration location in the borehole with the initial spacer configuration implemented;

set the initial spacer configuration as the first candidate spacer configuration when at least one of:
  contact parameters determined based at least in part on the contact force profile meet contact parameter thresholds; and
  the one or more spacers included in the initial spacer configuration are available to be implemented on the downhole tool string; and when the initial spacer configuration is not selected as the first candidate spacer configuration:
  adjust the initial spacer configuration by adding a first spacer to the initial spacer configuration, removing a second spacer from the initial spacer configuration, changing a location of a third spacer in the initial spacer configuration, or any combination thereof; and
  re-determine the contact force profile.

6. The manufacturing system of claim 1, wherein, to determine the final spacer configuration, the design device is configured to:

determine a first expected head tension output from the model, wherein the first expected head tension indicates a first force expected to be used to move the downhole tool string along the borehole at a first calibration location of the plurality of calibration locations with a first candidate spacer configuration of the plurality of candidate spacer configurations implemented;

determine a second expected head tension output from the model, wherein the second expected head tension indicates a second force expected to be used to move the downhole tool string along the borehole at a second calibration location of the plurality of calibration locations with the first candidate spacer configuration implemented;

determine a third expected head tension output from the model, wherein the third expected head tension indicates force expected to be used to move the downhole tool string along the borehole at the first calibration location with a second candidate spacer configuration of the plurality of candidate spacer configurations implemented;

determine a fourth expected head tension output from the model, wherein the fourth expected head tension indicates force expected to be used to move the downhole tool string along the borehole at the second calibration location with the second candidate spacer configuration implemented; and set the final spacer configuration as one of the first candidate spacer configuration and the second candidate spacer configuration based at least in part on the first expected head tension, the second expected head tension, the third expected head tension, and the fourth expected head tension.

7. The manufacturing system of claim 6, wherein, to determine the final spacer configuration, the design device is configured to:

determine a first maximum head tension associated with the first candidate spacer configuration based at least in part on the first expected head tension and the second expected head tension;

determine a second maximum head tension associated with the second candidate spacer configuration based at least in part on the third expected head tension and the fourth expected head tension; and select the first candidate spacer configuration as the final spacer configuration when the first maximum head tension is less than the second maximum head tension.

8. The manufacturing system of claim 6, wherein, to determine the final spacer configuration, the design device is configured to:

determine a first available head tension that indicates a first force expected to be available to move the downhole tool string along the borehole when deployed at the first calibration location;

determine a first head tension difference that indicates a difference between the first available head tension and the first expected head tension;

determine a second head tension difference that indicates a difference between the first available head tension and the third expected head tension;

determine a second available head tension that indicates a second force expected to be available to move the downhole tool string along the borehole when deployed at the second calibration location;

determine a third head tension difference that indicates a difference between the second available head tension and the second expected head tension;

determine a fourth head tension difference that indicates a difference between the second available head tension and the fourth expected head tension;

determine a first minimum head tension difference associated with the first candidate spacer configuration based at least in part on the first head tension difference and the third head tension difference;

determine a second minimum head tension difference associated with the second candidate spacer configuration based at least in part on the second head tension difference and the fourth head tension difference; and select the final spacer configuration as the first candidate spacer configuration when the first minimum head tension difference is greater than the second minimum head tension difference.

9. The manufacturing system of claim 1, wherein the final spacer configuration indicates a location of the one or more spacers on the downhole tool string, a type of each of the one or more spacers, or both.

10. The manufacturing system of claim 1, wherein:

the properties of the downhole tool string comprise an expected length of the downhole tool string, an expected weight of the downhole tool string, an expected size of a housing of the downhole tool string, an expected material composition of the housing, an expected type of downhole tools included in the downhole tool string, an expected location of the one or more spacers to be attached to the downhole tool string, an expected size of each of the one or more spacers, an expected type of each the one or more spacers, or any combination thereof;

the properties of the mud cake comprise an expected material composition of the mud cake, an expected thickness of the mud cake, or both;

the properties of the formation comprise an expected permeability of the sub-surface formation, an expected porosity of the sub-surface formation, or both; and the properties of the borehole comprise an expected deviation angle of the borehole, an expected size of borehole, an expected azimuth of the borehole, or any combination thereof.

11. The manufacturing system of claim 1, wherein the manufacturing tool is configured to attach a standoff, a roller, a stabilizer, or any combination thereof to a housing of the downhole tool string based at least in part on the final spacer configuration.

12. The manufacturing system of claim 1, wherein the design device is configured to:
  determine an actual head tension used to move the downhole tool string with the final spacer configuration implemented along the borehole; and
  when a difference between the actual head tension and the expected head tension associated with the final spacer configuration is greater than a threshold:
    update the model based at least in part on the difference;
    adjust the properties of the sub-surface formation expected to be present based at least in part on the difference;
    adjust the properties of the borehole expected to be present based at least in part on the difference;
    adjust the properties of the mud cake expected to be present based at least in part on the difference; or
    any combination thereof to facilitate subsequently determining another final spacer configuration.

13. The manufacturing system of claim 1, wherein:
  the design device comprises a handheld computing device, a tablet computing device, a notebook computer, a desktop computer, a workstation computer, a cloud-based computing device, or any combination thereof; and
  the manufacturing tool comprises a machine, equipment, or both used to assemble the downhole tool string.

14. A method for implementing a downhole tool string to be to deployed in a borehole formed in a sub-surface formation, comprising:
  determining, using a design device, a model that describes an expected relationship between properties of the downhole tool string, properties of the borehole, properties of the sub-surface formation, and properties of mud cake expected to be formed on a surface of the borehole;
  determining, using the design device, a plurality of candidate spacer configurations each corresponding to a different depth in the borehole, wherein each of the plurality of candidate spacer configurations:
    is determined based at least in part on a contact force expected to occur at one or more contact points between the downhole tool string and the mud cake when the downhole tool string is deployed at a corresponding depth in the borehole via the model; and
    indicates a location of one or more spacers to implement along the downhole tool string, a type of each of the one or more spacers, or both;
  selecting, using the design device, one of the plurality of candidate spacer configurations as a final spacer configuration based at least in part on an expected head tension to move the downhole tool string along the borehole when the downhole tool string is deployed with each of the plurality of candidate spacer configurations; and
  indicating, using the design device, the final spacer configuration to enable a manufacturing system to implement the one or more spacers along the downhole tool string based at least in part on the final spacer configuration before deployment in the borehole.

15. The method of claim 14, wherein determining the plurality of candidate spacer configurations comprises:
  determining a first calibration location at a first depth in the borehole based at least in part on first properties of the borehole expected to be present at the first calibration location;
  determining a candidate location at a second depth in the borehole;
  selecting the candidate location as a second calibration location when:
    an angle difference between a first expected deviation indicated by the first properties and a second expected deviation indicated by second properties of the borehole expected to be present at the candidate location is greater than an angle threshold; and
    a length of the borehole between the first calibration location and the candidate location is greater than a distance threshold;
  determining a first candidate spacer configuration based at least in part on a first contact force profile output from the model, wherein the first contact force profile indicates the contact force expected to occur at a first one or more contact points between the downhole tool string and the mud cake when the downhole tool string is deployed at the first calibration location with the first candidate spacer configuration implemented; and
  determining a second candidate spacer configuration based at least in part on a second contact force profile output from the model, wherein the second contact force profile indicates the contact force expected to occur at a second one or more contact points between the downhole tool string the mud cake when the downhole tool string is deployed at the second calibration location with the second candidate spacer configuration implemented.

16. The method of claim 14, wherein selecting one of the plurality of candidate spacer configurations as the final spacer configuration comprises:
  determining a first head tension profile output from the model, wherein the first expected head tension indicates a first force expected to be used to move the downhole tool string along the borehole at a first depth in the borehole with a first candidate spacer configuration of the plurality of candidate spacer configurations implemented;
  determining a second head tension profile output from the model, wherein the second head tension profile indicates a second force expected to be used to move the downhole tool string along the borehole at a second depth in the borehole with a second candidate spacer configuration of the plurality of candidate spacer configurations implemented; and selecting the first candidate spacer configuration as the final spacer configuration based at least in part on the first head tension profile and the second head tension profile.

17. The method of claim 16, wherein selecting the first candidate spacer configuration as the final spacer configuration comprises:

selecting the first candidate spacer configuration as the final spacer configuration when a first maximum head tension of the first head tension profile is less than a second maximum head tension of the second head tension profile;

selecting the first candidate spacer configuration as the final spacer configuration when a first minimum difference between the first head tension profile and an available head tension profile is greater than a second minimum difference between the second head tension profile and the available head tension profile; or both.

18. A tangible, non-transitory, computer-readable medium that stores instructions executable by one or more processors in a design device to facilitate implementing a downhole tool string, wherein the instructions comprise instructions to:

determine, using the one or more processors, a model that describes an expected relationship between properties of the downhole tool string, properties of a borehole in which the downhole tool string is expected to be deployed, properties of the sub-surface formation expected to surround the borehole, and properties of mud cake expected to be formed on a surface of the borehole;

determine, using the one or more processors, a plurality of candidate spacer configurations each corresponding to a different depth in the borehole, wherein each of the plurality of candidate spacer configurations:

is determined based at least in part on a contact force expected to occur at one or more contact points between the downhole tool string and the mud cake when the downhole tool string is deployed at a corresponding depth in the borehole via the model; and indicates a location of one or more spacers to implement along the downhole tool string, a type of each of the one or more spacers, or both;

select, using the one or more processors, one of the plurality of candidate spacer configurations as a final spacer configuration based at least in part on an expected head tension to move the downhole tool string along the borehole when the downhole tool string is deployed with each of the plurality of candidate spacer configurations; and indicate, using the one or more processors, the final spacer configuration to enable a manufacturing system to implement the one or more spacers along the downhole tool string based at least in part on the final spacer configuration before deployment in the borehole.

19. The tangible, non-transitory, computer-readable medium of claim 18, wherein the instructions to determine the plurality of candidate spacer configurations comprises instructions to:

determine a first calibration location at a first depth in the borehole based at least in part on first properties of the borehole expected to be present at the first calibration location;

determine a candidate location at a second depth in the borehole;

select the candidate location as a second calibration location when:

an angle difference between a first expected deviation indicated by the first properties and a second expected deviation indicated by second properties of the borehole expected to be present at the candidate location is greater than an angle threshold; and a length of the borehole between the first calibration location and the candidate location is greater than a distance threshold;

determine a first candidate spacer configuration based at least in part on a first contact force profile output from the model, wherein the first contact force profile indicates the contact force expected to occur at a first one or more contact points between the downhole tool string and the mud cake when the downhole tool string is deployed at the first calibration location with the first candidate spacer configuration implemented; and determine a second candidate spacer configuration based at least in part on a second contact force profile output from the model, wherein the second contact force profile indicates the contact force expected to occur at a second one or more contact points between the downhole tool string and the mud cake when the downhole tool string is deployed at the second calibration location with the second candidate spacer configuration implemented.

20. The tangible, non-transitory, computer-readable medium of claim 19, wherein the instructions to select one of the plurality of candidate spacer configurations as the final spacer configuration comprises instructions to:

determine a first head tension profile output from the model, wherein the first expected head tension indicates a first force expected to be used to move the downhole tool string along the borehole at a first depth in the borehole with a first candidate spacer configuration of the plurality of candidate spacer configurations implemented;

determine a second head tension profile output from the model, wherein the second head tension profile indicates a second force expected to be used to move the downhole tool string along the borehole at a second depth in the borehole with a second candidate spacer configuration of the plurality of candidate spacer configurations implemented; and select the first candidate spacer configuration as the final spacer configuration based at least in part on the first head tension profile and the second head tension profile when at least one of:

a first maximum head tension of the first head tension profile is less than a second maximum head tension of the second head tension profile; and a first minimum difference between the first head tension profile and an available head tension profile is greater than a second minimum difference between the second head tension profile and the available head tension profile.

* * * * *